(12) United States Patent
McLoughlin

(10) Patent No.: US 9,150,136 B2
(45) Date of Patent: Oct. 6, 2015

(54) RADIO-CONTROLLED CARGO TRUCK RAMP LOAD ASSIST SYSTEM

(71) Applicant: ROM ACQUISITION CORPORATION, Belton, MO (US)

(72) Inventor: John E. McLoughlin, Hauppauge, NY (US)

(73) Assignee: ROM Acquisition Corporation, Belton, MO (US)

( * ) Notice: Subject to any disclaimer, the term of this patent is extended or adjusted under 35 U.S.C. 154(b) by 115 days.

(21) Appl. No.: 14/102,115

(22) Filed: Dec. 10, 2013

(65) Prior Publication Data

US 2014/0227070 A1 Aug. 14, 2014

Related U.S. Application Data

(60) Provisional application No. 61/763,711, filed on Feb. 12, 2013.

(51) Int. Cl.
*B60P 1/43* (2006.01)
*B65G 69/30* (2006.01)

(52) U.S. Cl.
CPC .. *B60P 1/43* (2013.01); *B65G 69/30* (2013.01)

(58) Field of Classification Search
CPC .................................. B60P 1/43; B65G 69/30
USPC ............................ 414/538, 814, 537; 14/71.1
See application file for complete search history.

(56) References Cited

U.S. PATENT DOCUMENTS

| 2,629,120 | A | * | 2/1953 | Nelson | 14/69.5 |
|---|---|---|---|---|---|
| 3,155,258 | A | * | 11/1964 | Fincannon | 414/498 |
| 3,532,058 | A | * | 10/1970 | Van Der Meide | 104/306 |
| 4,221,536 | A | * | 9/1980 | McFee | 414/812 |
| 5,394,583 | A | * | 3/1995 | Plate | 14/69.5 |
| 6,149,372 | A | * | 11/2000 | Lee et al. | 414/538 |
| 8,579,304 | B2 | * | 11/2013 | Setzer et al. | 280/47.29 |
| 2011/0276181 | A1 | * | 11/2011 | Lamb et al. | 700/275 |
| 2013/0315695 | A1 | * | 11/2013 | Meyers | 414/491 |

* cited by examiner

*Primary Examiner* — Kaitlin Joerger
(74) *Attorney, Agent, or Firm* — Wei Wei Jeang; Grable Martin Fulton PLLC

(57) ABSTRACT

A cargo truck ramp load assist system comprises a hand truck engagement device disposed in a longitudinal slot in a cargo truck ramp, a first actuator coupled to the hook operable to effect displacement of the hand truck engagement device along the longitudinal slot in the ramp, a remote controller coupled to a hand truck and equipped with a first radio transceiver, a second radio transceiver coupled to the first actuator operable to receive directional/speed control signals from the remote controller, and the hand truck engagement device operable to engage the hand truck and the first actuator effecting displacement of the hand truck engagement device up and down the ramp in response to the directional/speed control signals to facilitate the hand truck going up and down the ramp.

18 Claims, 4 Drawing Sheets

RADIO-CONTROLLED CARGO TRUCK RAMP LOAD ASSIST SYSTEM

RELATED APPLICATION

This patent application claims the benefit of U.S. Provisional Patent Application No. 61/763,711 filed on Feb. 12, 2013.

FIELD

This disclosure relates to cargo trucks, and is related in particular to a radio-controlled cargo truck ramp load assist system and method.

BACKGROUND

Cargo trucks such as box trucks and semi-trailer trucks are the primary way of distributing and moving goods across land. The trucking industry provides an essential service to the American economy by transporting large quantities of raw materials, parts, and finished goods from manufacturing plants to wholesalers, distribution centers, and retail stores. Trucks are responsible for the majority of freight movement over land, and are vital components in the manufacturing, transportation, and warehousing industries.

In most cargo trucks, the floor of the cargo space is typically several feet above ground level. When loading or unloading goods using a hand truck or dolly, a ramp is often used to bridge the gap in elevation. However, for heavy or bulky loads, it is often a challenge to wheel the hand truck up and down the ramp in a safe manner. For example, due to the weight or bulk of the cargo, the hand truck may easy become out of control or gain speed down the ramp. Injury to the operator and damage to the cargo may result.

SUMMARY

A cargo truck ramp load assist system comprises a hand truck engagement device disposed in a longitudinal slot in a cargo truck ramp, a first actuator coupled to the hook operable to effect displacement of the hand truck engagement device along the longitudinal slot in the ramp, a remote controller coupled to a hand truck and equipped with a first radio transceiver, a second radio transceiver coupled to the first actuator operable to receive directional/speed control signals from the remote controller, and the hand truck engagement device operable to engage the hand truck and the first actuator effecting displacement of the hand truck engagement device up and down the ramp in response to the directional/speed control signals to facilitate the hand truck going up and down the ramp.

A cargo truck ramp load assist system comprises a hook disposed in a longitudinal slot in a cargo truck ramp, a first actuator coupled to the hook operable to effect displacement of the hook along the longitudinal slot in the ramp, a second actuator coupled to the hook operable to effect raised and lowered positions of the hook, a user interface configured to receive control input from an operator, a remote controller coupled to a hand truck and equipped with a first radio transceiver, the first radio transceiver configured to transmit the control input from the operator, a second radio transceiver coupled to the first actuator operable to receive the control input from the remote controller, and the hook operable to engage the hand truck and the first actuator effecting displacement of the hook up and down the ramp and the second actuator effecting raised and lowered positions in response to the control input to facilitate the operation of hand truck going up and down the ramp.

A remote-controlled cargo truck ramp loading method comprises elevating a hook disposed in a longitudinal slot in the cargo truck ramp, engaging a hand truck carrying a load with the hook, facilitating the hand truck going up or down the ramp via remote controlling the displacement of the hook along the longitudinal slot, and lowering the hook.

DESCRIPTION

Figure 1:
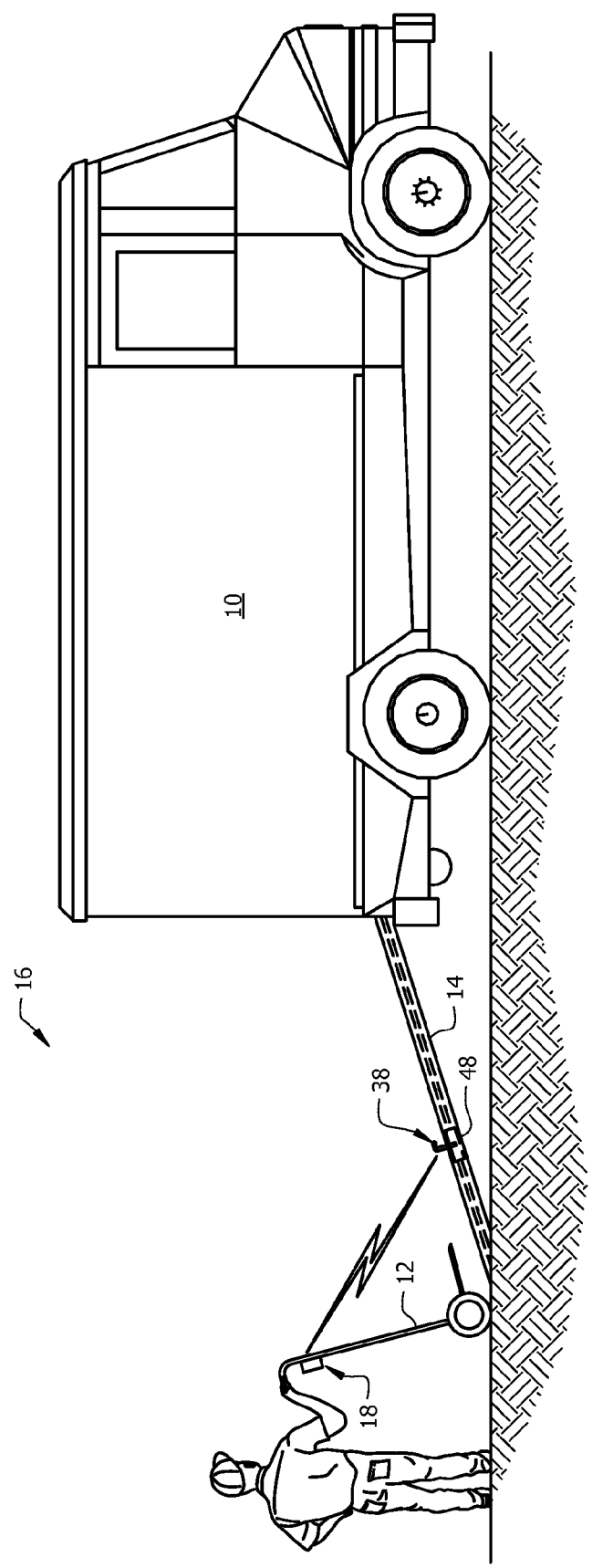
FIG. 1 is a perspective view of an exemplary embodiment of the load assist system according to the teachings of the present disclosure.
Figure 2:
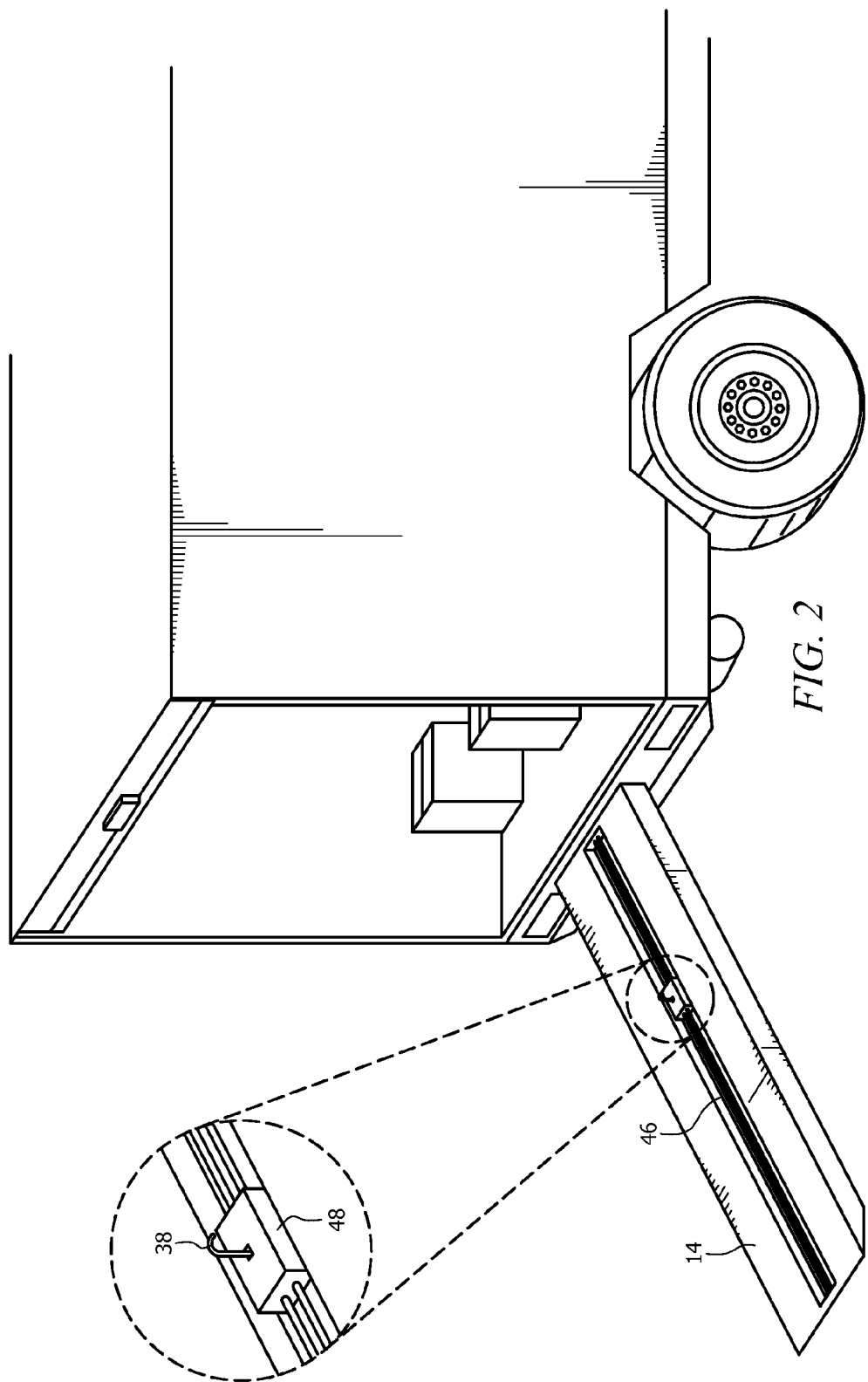
FIG. 2 is a more detailed perspective view of an exemplary embodiment of the load assist system according to the teachings of the present disclosure.

Referring to FIGS. 1 and 2, a cargo vehicle 10 is a vehicle with a primary function of hauling goods and freight on roadways and highways, such as a box truck or a tractor trailer. Cargo vehicle 10 includes cargo space that is elevated several feet above ground level. A load assist system 16 incorporated in the hand truck 12 and ramp 14 is used to help load and unload goods into and out from the cargo space in a manner that avoids injury to the operator and damage to the goods being transported.

The ramp 14 is an elongated segment of platform that is used to enable an operator to push a hand truck 12 up the ramp into the cargo space or unload goods from the cargo space. The ramp 14 may be constructed of a strong and light-weight metal or metal composite including aluminum. The hand truck 12 and ramp 14 are equipped with a load assist system 16 that is operable to provide assistance to move the hand truck up or down the ramp 14 being controlled by the operator. The ramp 14 is equipped with a hook, protruding member, or engagement device 38 that may temporarily engage the hand truck 12.

Figure 3:
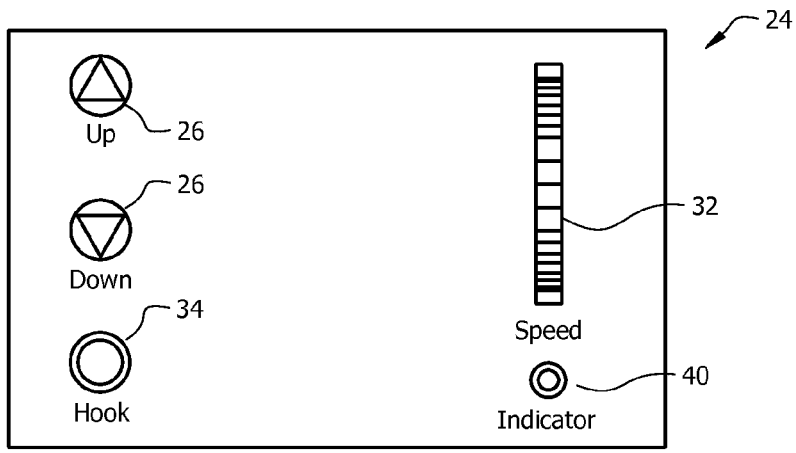
FIG. 3 is a more detailed view of an exemplary embodiment of a user interface and visual indicator device of the load assist system according to the teachings of the present disclosure.
Figure 4:
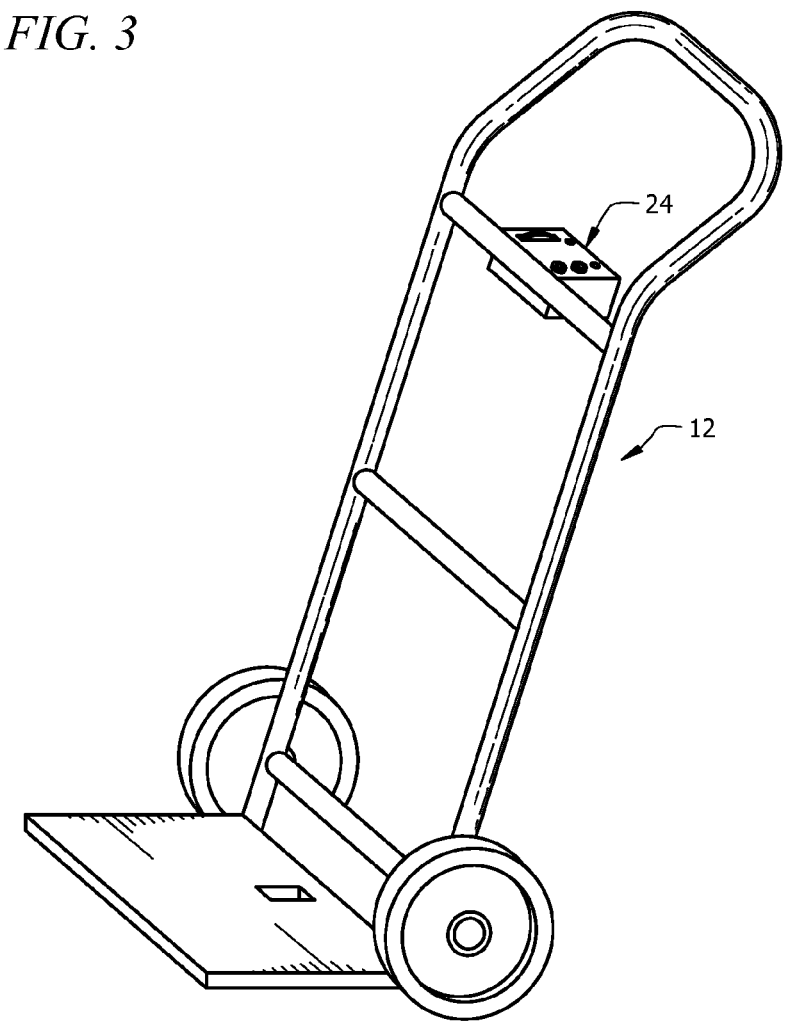
FIG. 4 is a more detailed view of an exemplary embodiment of a hand truck controller of the load assist system according to the teachings of the present disclosure.
Figure 5:
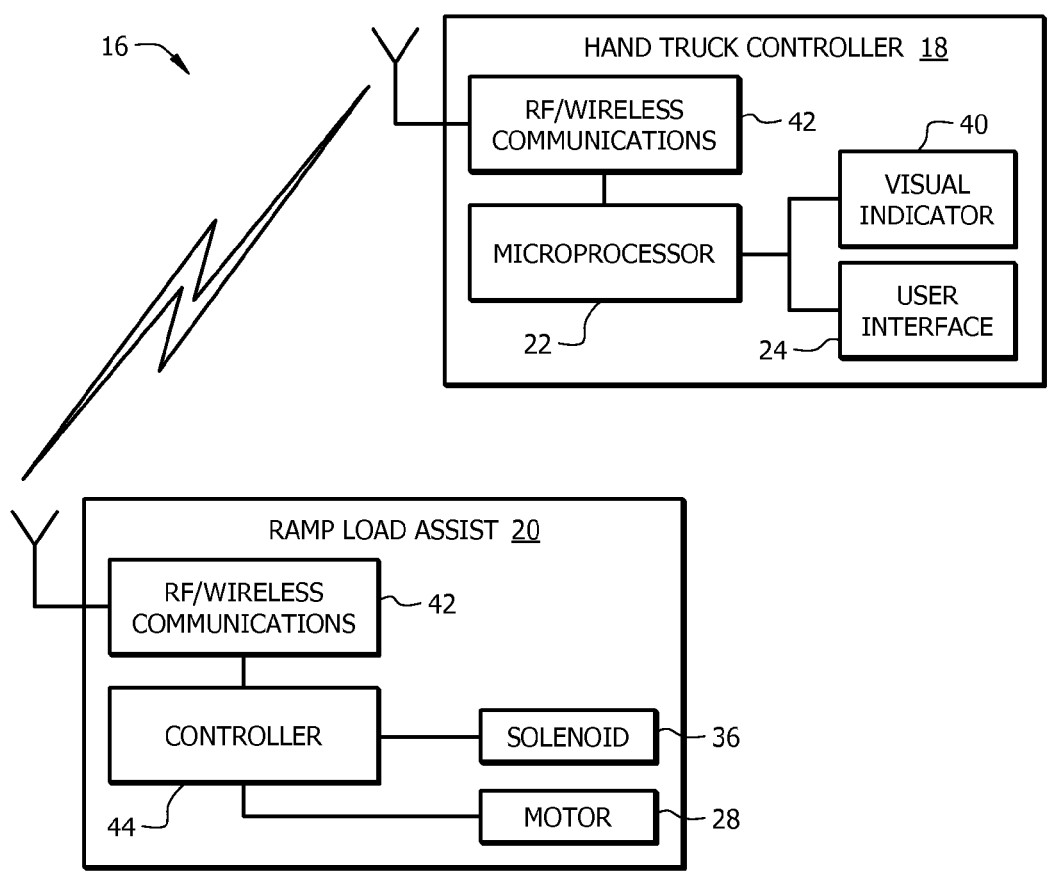
FIG. 5 is a simplified block diagram of an exemplary embodiment of the load assist system according to the teachings of the present disclosure.

Referring also to FIGS. 3-5, the load assist system 16 includes controller circuitry 18 disposed on the hand truck 12 that communicates wirelessly with ramp load assist circuitry 20 disposed on the ramp and enables an operator to control its operations. The hand truck controller 18 includes a microprocessor or microcontroller 22 specially configured to receive input from the operator via a user interface 24 to control the operations of the load assist system 16. For example, the user interface 24 may include up and down buttons 26 to control a motor 28 in the ramp load assist circuitry 20 that moves a cable or chain 30 disposed under the top surface of the ramp 14 to control the direction of travel up or down the ramp. The motor 28 may be any suitable electric/hydraulic/air-control motor with variable speed and direction capabilities. The user interface 24 may further include a speed control input, such as a thumb wheel 32 to control the motor speed which in turns sets the travel speed of the cable/chain 30. A number of pre-set speed settings such as slow, medium, and fast may be provided.

Another user input device may include a button 34 that is used to control a solenoid 36 disposed in the ramp 14 that is coupled to a hook or protrusion 38 disposed in the ramp 14 and coupled to the motor 28 that can be raised to engage and lowered to disengage the hand truck 12 on the ramp. The user interface 24 is preferably integrated with or otherwise securely fastened to the handle bar or frame of the hand truck 12. The hand truck controller 18 is preferably designed and positioned so that the operator may easily operate the controls of the user interface 24 while still able to safely and comfortably push and pull the hand truck.

The hand truck controller 18 may further include a visual indicator 40 to provide a visual indication of the system operation status. For example, multi-colored LEDs (light emitting diodes) may be used to indicate that the system is on/off and whether it is in a ready status. Further, an indicator (LED) may be used to indicate whether the hook 38 is in its raised or lowered position. The up and down buttons 26 may also be lit or dimmed to visually reflect the current directional status of the ramp load assist assembly 20. The visual indicator 40 is especially useful when transporting bulky loads that may block the operator's view of the ramp.

The hand truck controller 18 communicates the operator commands to the ramp load assist assembly 20 via a wireless communication link between the respective transceivers and antennae 40 and 42. The wireless communication link preferably uses radio frequency in accordance with suitable protocols to transmit signals between the hand truck controller 18 and the ramp load assist assembly 20. Other modes of wireless communication now known or developed in the future that use other transmission media such as light, sound, electromagnetic fields may be used. The commands received by the wireless transceiver 42 in the ramp load assist assembly 20 is passed on to the controller 44, which in turn interprets the commands and sends instructions to the solenoid 36 to control the hook operations and the motor 28 to control the direction of the hook movement along the ramp.

Referring particularly to FIG. 2, the ramp 14 preferably incorporates a longitudinal slot 46 disposed in or near the center of the ramp 14. The ramp load assist assembly 20 enables the hook 38 to be raised through the longitudinal slot 46 and engage a bottom component of the hand truck 14 such as the axle or a slot in the bottom load-carrying platform. The hook 38 can be lowered when not in use to avoid a tripping hazard. The ramp load assist assembly 20 incorporates an actuation system such as a winch/rack and pinion/cable/pulley system or a bidirectional motor 28 that is operable to displace the hook 38 up and down the ramp 14. Preferably, the ramp load assist assembly 20 and the hook 36 are housed in a sturdy and weatherproof enclosure 48 that is operable to travel along the ramp along the cable or chain and pulley system.

To load the vehicle with cargo, the hand truck 12 is positioned near the lower end of the ramp 14 and the operator instructs the system to raise the hook 38 via the user interface 24. When extended, the hook 38 engages the hand truck 12, and the operator can control the speed, again via the user interface 24, that the hook 28 travels up the ramp, assisting in lifting the heavy load on the hand truck 12. At the top of the ramp, the operator lowers the hook 38 or the hook is lowered automatically, and the hand truck 12 can easily be wheeled into the cargo box to unload the goods. The hand truck user interface 24 is preferably positioned so the operators do not have to take their hand off the power handle to operate the controls.

Although not shown, storage space beneath the floor of the cargo hold may accommodate the ramp 14 when the ramp is not in use. In this manner, the ramp 14 may be pulled out from the storage space and placed into position when it is needed, and put away into the space and out of the way when not needed.

Although not described in detail, the hand truck controller 18 and the ramp load assist assembly 20 include suitable power supplies such as batteries to power the electronic and electrical components. Alternatively, the ramp load assist 20 may draw power from the battery of the cargo vehicle.

The specific configuration of the hook or engagement device and the component on the hand truck that is engaged is preferably designed according to the design and construction of the hand truck. For example, the axle of the hand truck may be a convenient location to engage the hook. Alternatively, the nose plate that carries the load on the hand truck may incorporate an opening that enables the hook engagement.

Accordingly, personnel unloading or loading the cargo truck using a hand truck can receive assistance with heavy or bulky loads. The hook disposed in the ramp can be easily attached to the hand truck, and the system facilitates moving the hand truck up the ramp or down the ramp under remote radio control. The load assist system 16 is operable to provide the benefit of added safety by supporting the weight of the load as well as guiding the travel of the hand truck on the ramp.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A cargo truck ramp load assist system, comprising:
   a hand truck engagement device disposed in a longitudinal slot in a cargo truck ramp;
   a first actuator coupled to a hook operable to effect displacement of the hand truck engagement device along the longitudinal slot in the ramp;
   a remote controller coupled to a hand truck and equipped with a first radio transceiver;
   a second radio transceiver coupled to the first actuator operable to receive directional/speed control signals from the remote controller; and
   the hand truck engagement device operable to engage the hand truck and the first actuator effecting displacement of the hand truck engagement device up and down the ramp in response to the directional/speed control signals to facilitate the hand truck going up and down the ramp.

2. The system of claim 1, further comprises a second actuator operable to raise and lower the hook.

3. The system of claim 1, wherein the remote controller further comprises a user interface configured to receive directional/speed inputs from an operator.

4. The system of claim 3, wherein the user interface comprises:
   a directional control interface configured to receive a directional input from the operator;
   a speed control interface configured to receive a speed input from the operator; and a hook control interface configured to receive a hook raising and lowering input from the operator.

5. The system of claim 1, wherein the first actuator comprises a variable speed motor.

6. The system of claim 1, further comprising a cable and pulley system coupled to the first actuator and configured to effect displacement of the hook along the longitudinal slot in the ramp.

7. The system of claim 1, wherein the hand truck engagement device comprises a hook configured to engage a component of the hand truck.

8. The system of claim 1, wherein the remote controller further comprises a visual indicator configured to visually provide system operational status.

9. A cargo truck ramp load assist system, comprising:
   a hook disposed in a longitudinal slot in a cargo truck ramp;
   a first actuator coupled to the hook operable to effect displacement of the hook along the longitudinal slot in the ramp;
   a second actuator coupled to the hook operable to effect raised and lowered positions of the hook;
   a user interface configured to receive control input from an operator;
   a remote controller coupled to a hand truck and equipped with a first radio transceiver, the first radio transceiver configured to transmit the control input from the operator;
   a second radio transceiver coupled to the first actuator operable to receive the control input from the remote controller; and
   the hook operable to engage the hand truck and the first actuator effecting displacement of the hook up and down the ramp and the second actuator effecting raised and lowered positions in response to the control input to facilitate the operation of hand truck going up and down the ramp.

10. The system of claim 9, wherein the user interface comprises:
   a directional control interface configured to receive a directional input from the operator;
   a speed control interface configured to receive a speed input from the operator; and
   a hook control interface configured to receive a hook raising and lowering input from the operator.

11. The system of claim 9, wherein the first actuator comprises a variable speed motor.

12. The system of claim 9, further comprising a cable and pulley system coupled to the first actuator and configured to effect displacement of the hook along the longitudinal slot in the ramp.

13. The system of claim 9, wherein the remote controller further comprises a visual indicator configured to visually provide system operational status.

14. A remote-controlled cargo truck ramp loading method, comprising:
   elevating a hook disposed in a longitudinal slot in the cargo truck ramp;
   engaging a hand truck carrying a load with the hook;
   facilitating the hand truck going up or down the ramp via remote controlling the displacement of the hook along the longitudinal slot; and
   lowering the hook.

15. The method of claim 14, further comprising receiving an operator input to elevate and lower the hook.

16. The method of claim 14, further comprising receiving an operator input to displace the hook in a specified direction along the longitudinal slot up and down the ramp.

17. The method of claim 14, further comprising receiving an operator input to displace the hook according to a speed setting along the longitudinal slot up and down the ramp.

18. The method of claim 14, further comprising providing a visual indication of direction and speed operational status to the operator.

* * * * *